COLOR IMAGE SIGNAL TRANSLATING SYSTEM

Filed Nov. 1, 1957 5 Sheets-Sheet 1

INVENTOR
ADOLPH RAZDOW
BY [signature]
ATTORNEY

COLOR IMAGE SIGNAL TRANSLATING SYSTEM

Filed Nov. 1, 1957 5 Sheets-Sheet 2

INVENTOR
ADOLPH RAZDOW
BY [signature]
ATTORNEY

COLOR IMAGE SIGNAL TRANSLATING SYSTEM

Filed Nov. 1, 1957 5 Sheets-Sheet 3

INVENTOR
ADOLPH RAZDOW
BY [signature]
ATTORNEY

May 9, 1961 A. RAZDOW 2,983,784

COLOR IMAGE SIGNAL TRANSLATING SYSTEM

Filed Nov. 1, 1957 5 Sheets-Sheet 4

INVENTOR
ADOLPH RAZDOW
BY [signature]
ATTORNEY

May 9, 1961 A. RAZDOW 2,983,784

COLOR IMAGE SIGNAL TRANSLATING SYSTEM

Filed Nov. 1, 1957 5 Sheets-Sheet 5

INVENTOR
ADOLPH RAZDOW
BY [signature]
ATTORNEY 2,983,784

COLOR IMAGE SIGNAL TRANSLATING SYSTEM

Adolph Razdow, Montclair, N.J., assignor to Bryg, Inc., Butler, Pa., a corporation of Pennsylvania Filed Nov. 1, 1957, Ser. No. 693,951

7 Claims. (Cl. 178—5.4)

The present invention relates to a color image signal translating system in general, and to a black-and-white film recording system for color television in particular, and also to methods and apparatus for recording information representing colored images on non-color sensitized recording media such as monochrome film, magnetic tape or the like.

It has been recognized before that a recording of color television programs on color films is not only an expensive but also a time consuming procedure and it has been also recognized that the storing of color information on monochrome film brings about a drastic reduction of the cost of such film.

It has been proposed before, therefore, to record color television images on black-and-white film. In accordance with this known method vertical compressed television fields are provided on a piece of film. The left hand column of images represents successive fields of the luminance signal and the right hand column of images represents alternate fields of chrominance information which were preferably red and blue. As the film moves continuously, an image from the scanner tube is focused by means of a beam splitter on each of the three film images. They are a luminance image, the chrominance image beside that luminance image and the chrominance image directly above and to the right of the luminance image. The cathode-ray scanner tube produces either a single line scan or a very narrow raster, which raster may be produced either optically or electronically. Photomultipliers gather the light from each of the three scanned images and one of the photomultipliers reads luminance information at the same time that the other two photomultipliers are continuously reading chrominance information. If the recorded chrominance information is red and blue, then one of the latter photomultipliers will read red one field, blue the next field, red the third field, and so on. Each of the two last mentioned photomultipliers reads different color information on successive fields, but in any given field, one of them reads blue and the other reads red.

While this known system was applicable for certain situations, it had inherently several drawbacks which did not permit general application for the recording of color television images on black-and-white film.

It is, therefore, one object of the present invention to provide a system for black-and-white film recording for color television use which avoids the drawbacks of the known systems.

Fundamentally, the novel system is based on the observation that in normal viewing the acuity of the human eye for color detail is markedly less than that for luminance or black-and-white brightness details.

It is another object of the present invention to provide a black-and-white film recording for color television use wherein the required third color image, i.e. a green color image, is produced by combining two signals filtered through two other colors, as for instance red and blue filtered signals with a high resolution black-and-white luminance signal. The colored object is filmed on a frame, preferably of 16 or 35 mm. which is subdivided into three portions. One black-and-white high resolution frame is arranged while two frames of red and blue chrominance of lesser resolution filtered thereto. Through electronic matrixing in the projector system, the proper proportions of luminance and chrominance information including green, are produced.

It is yet another object of the present invention to provide a system for black-and-white film recording for color television use, wherein the optical filtering for the red and blue signals and the electronic computation of the green signal bring about the important advantage of requiring only two comparatively low resolution color images and an easily produced high resolution black-and-white image.

It is also a further object of the present invention to provide a lens system for the camera in the production of the black-and-white film recording for color television use which permits of splitting of the beams for a black-and-white as well as red and blue resolution.

It is also a further object of the present invention to provide an electronic matrix in the system for black-and-white film recording for color television use, which matrix is intended to be used with a system requiring the black-and-white signal directly, while for instance the red and blue signal combined with the black-and-white signal lead to the required green signal.

With these and other objects in view which will become apparent in the following detailed description, the present invention will be clearly understood in connection with the accompanying drawings, in which.

Figures 1, 2:
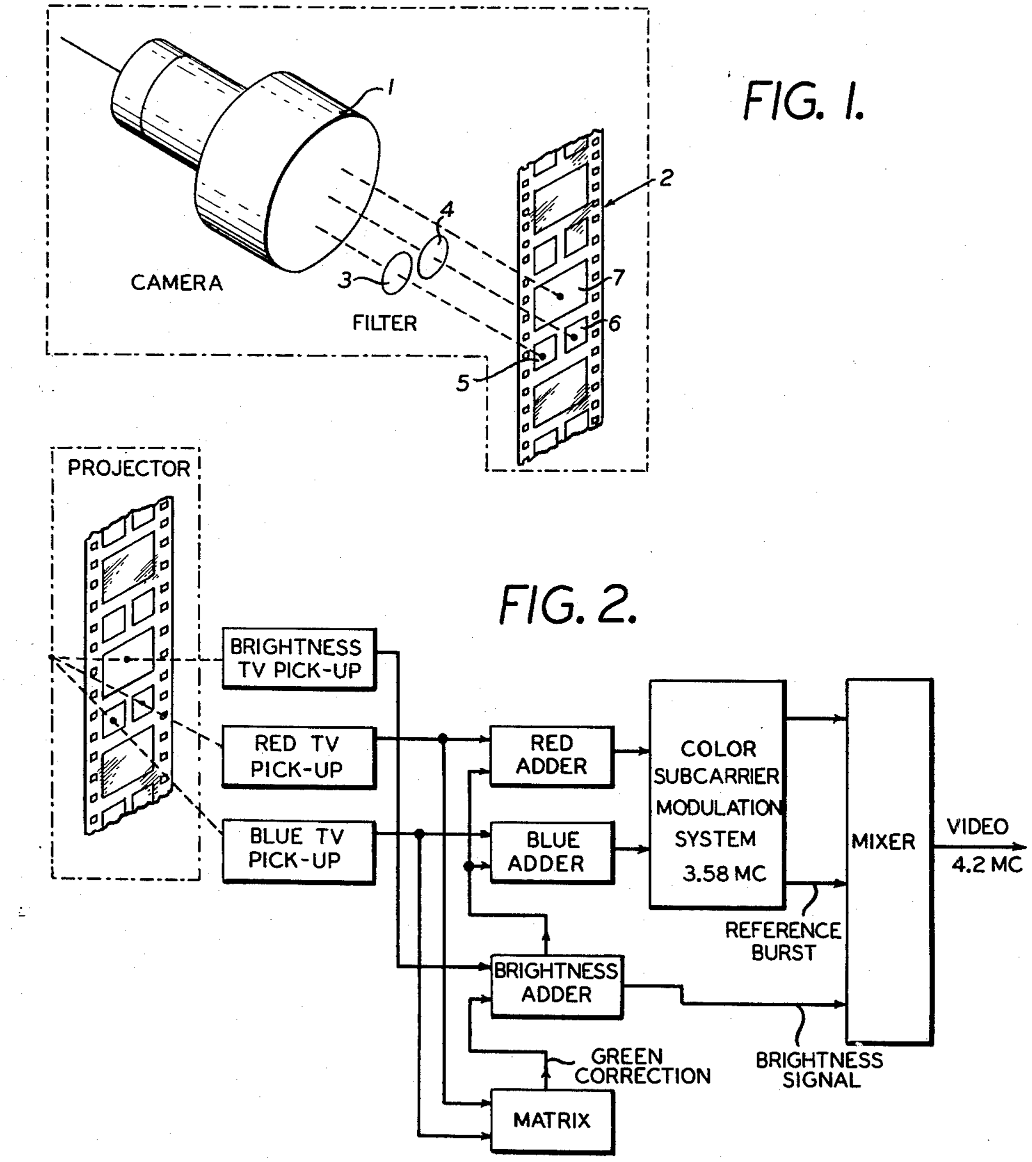
Figure 1 is a schematic showing of the special camera used in connection with the special film created for the purpose of the present invention.
Fig. 2 is a schematic showing of the projector together with the diagram indicating the feeding of the three signals into the television system.
Figure 7:
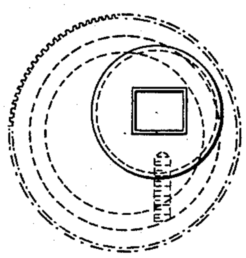
Figs. 7 and 8 are respective end views thereof.
Figures 6, 8:
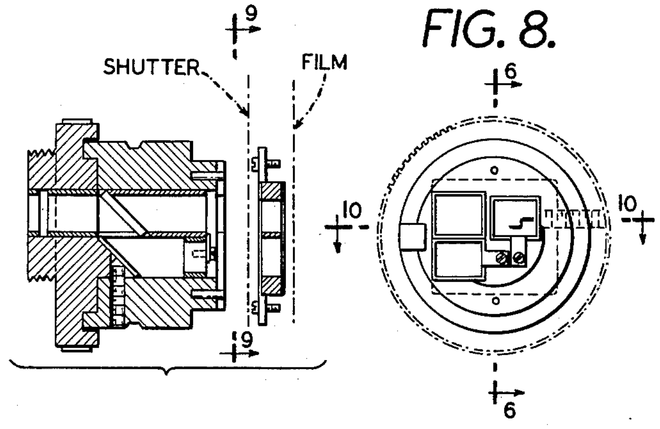
Fig. 6 is an axial section of the camera lens mount.
Figure 9:
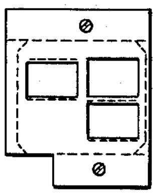
Fig. 9 is a section along the lines 9—9 of Fig. 8.
Figure 10:
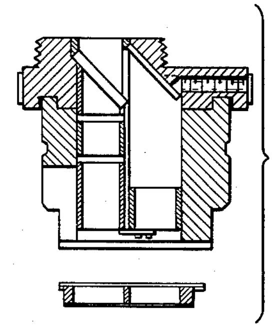
Fig. 10 is a section along the lines 10—10 of Fig. 8.
Figure 11:
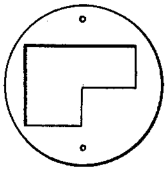
Fig. 11 is an elevation of the filter frame.
Figure 14:
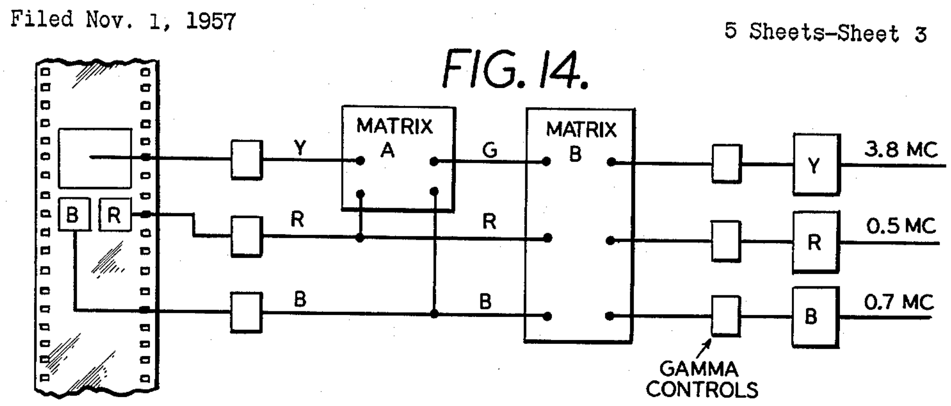
Fig. 14 is a schematic showing for the electronic determination of the green component.
Figures 3, 12:
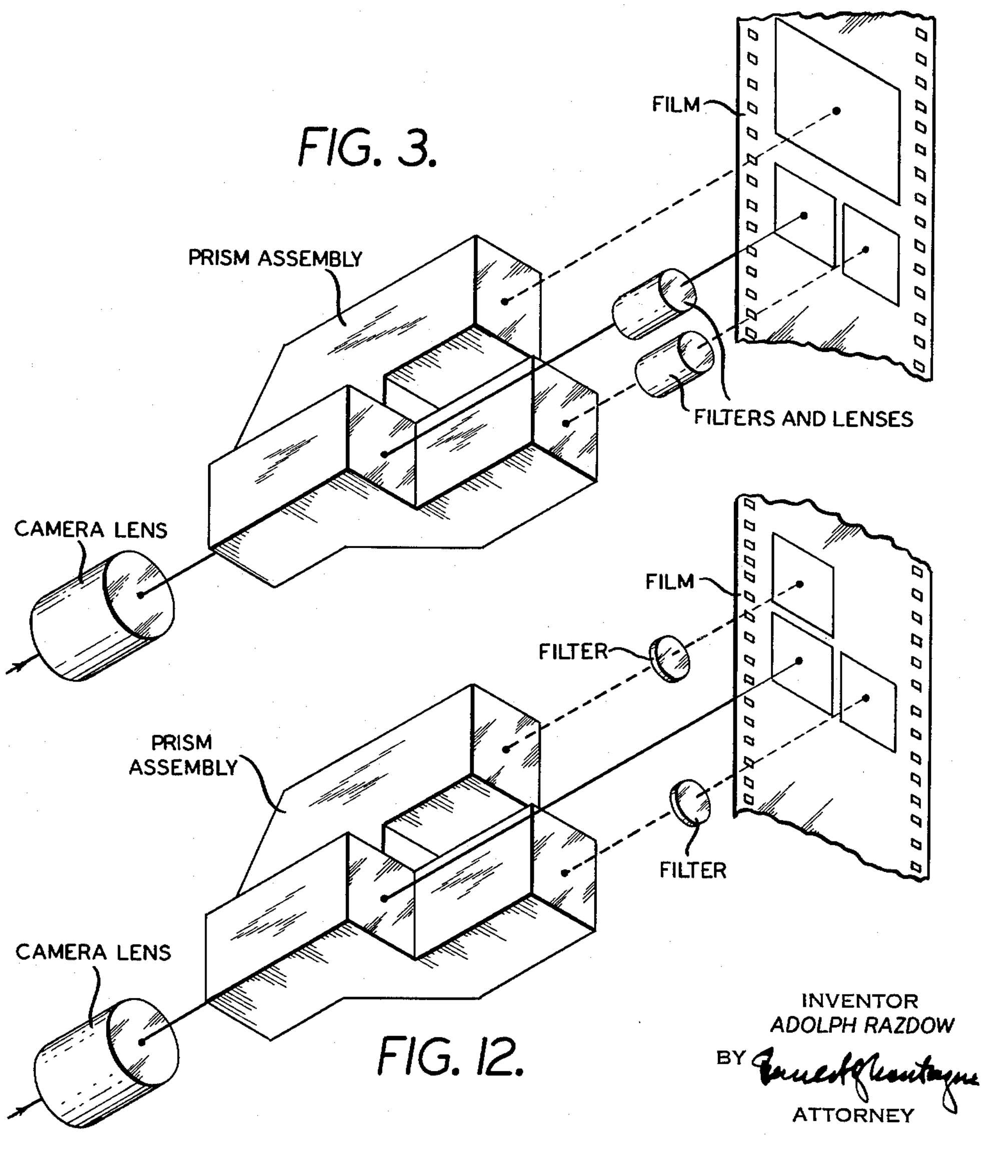
Fig. 3 is a schematic showing of the camera lens system in combination with a prism system in order to supply the beams into three parts.
Fig. 12 is a prism arrangement for a variation in the film which is provided and wherein all three fields, namely, the black-and-white field as well as the red and blue fields are of the same size.
Figure 5:
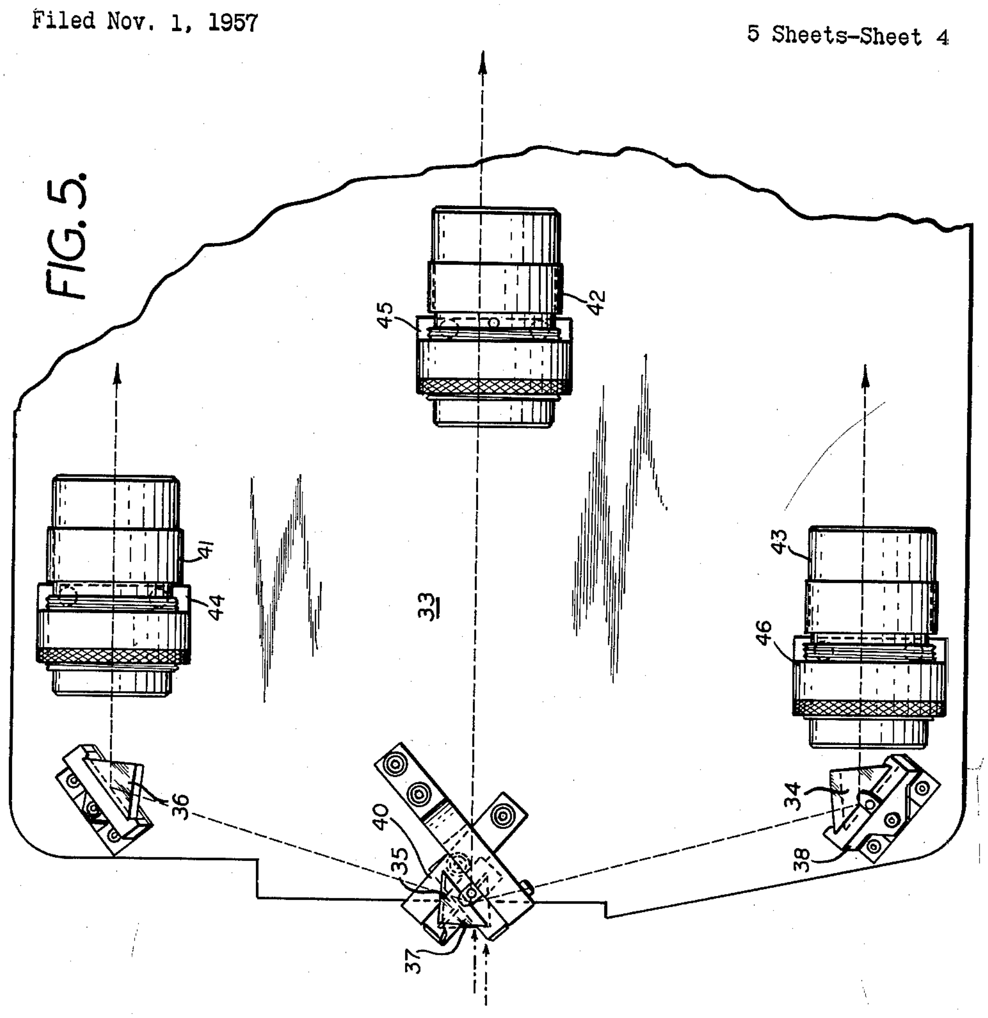
Fig. 5 is a top plan view of the system shown in Fig. 4.
Figure 4:
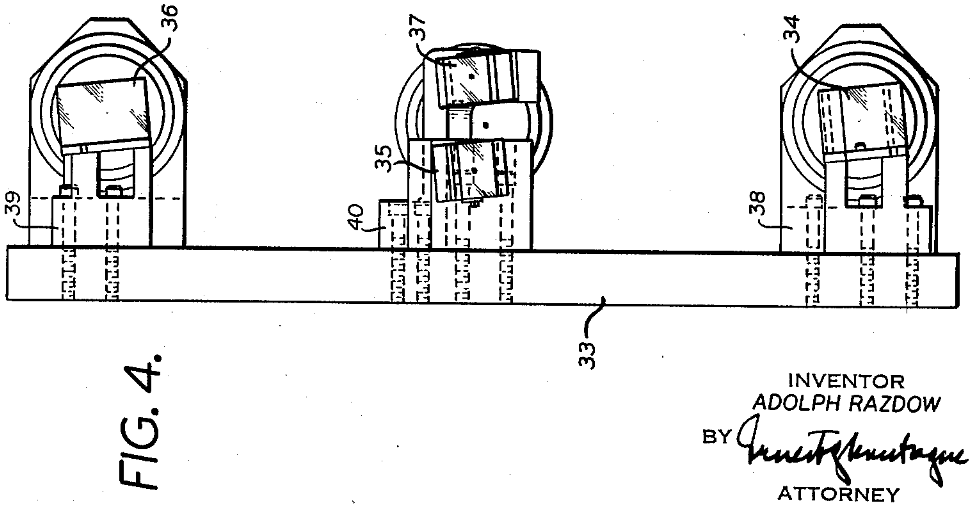
Fig. 4 is an end view of the actual prism arrangement forming part of the camera.

Referring now to the drawings and in particular to Figs. 1 and 2, a camera 1 is provided which splits the beam into three parallel parts. The colored object is filmed preferably on a frame of preferably 16 or 35 mm. film 2 which is subdivided into three portions. Red and blue beam components are filtered by means of the filters 3 and 4, respectively, onto two smaller low resolution frames 5 and 6, while the black-and-white beam component is provided with a high resolution full frame 7. In this manner a black-and-white film may be produced which records information representing colored images on a monochrome film.

The conventional color TV uses a color image derived either from a live scene or from a color film. The image is split into the basic additive colors, namely, red, blue and green and the three images are then processed to the TV camera tubes. The camera tube output is processed in amplifiers and matrices to the chrominance amplifiers and the luminance amplifiers. The chrominance channels feed the "red" and "blue" signals, whereas the luminance signal is obtained from the combination of the three color signals, namely the red, blue and green signals. In order to obtain a correct black-and-white luminance signal the three color components have to be added at their correct volume in accordance with the following formula:

$$E_Y = 0.30E_R + 0.59E_G + 0.11E_B$$

A black-and white signal or system would have the advantage of a fast and simpler developing time and more economic processing operation. The color chain could be supplied from three black-and-white images obtained from three filtered channels.

This approach would be impractical, however, because three separate film frames have to be used and the film speed has to be tripled. Yet, this procedure is impractical because the mechanical system would not perform correctly and the film would be damaged.

In accordance with another approach, one film frame would be subdivided into three or four fields for the three black-and-white, color filtered images. The optical resolution would, however, be decreased, because each image will amount to only a fourth of the conventional frame and decrease, therefore, the resolution.

Still another approach amounts to the use of the three basic signals used in the TV transmission, i.e. the luminance information Y, the two chrominance information R and B, by recording them on a film in three or four fields on a 16 or 35 mm. frame. The transmission of the signals is obtained through a scanner tube system. The three scanner tubes have a horizontal line only and the film runs continuously with one complete image passing any given point, each $\frac{1}{60}$ of a second. Though only two images were recorded simultaneously, three were scanned simultaneously. Thus, one part of the color information would be $\frac{1}{60}$ of a second out of step with the remaining luminance and chrominance information. The left hand column of images on the film represents successive fields of the luminance (Y) signals. The right hand column of images represents alternate fields of chrominance information, which can be red and blue. As the film moves continuously, an image from the scanner tube is focused by means of a beam splitter on each of three film images. There are a luminance image, the chrominance image beside the luminance image, and the chrominance image directly above and to the right of the luminance image. Optical or electronic rasters are used and photomultipliers read the information. Because of the arrangement of the red and blue fields in one column the photomultipliers have to be switched in a special electronic switch which is keyed at the field rate. The information has to be sorted out so that one luminance signal and two consistent chrominance signals are always available. In the case of a kinescope recording the unexposed film is moved continuously at a synchronous rate. The left hand column of images is recorded directly from a cathode-ray tube with a single line or compressed raster. The sube is modulated by the luminance signal. The right hand column of images is recorded directly from a second cathode-ray tube with similar sweep characteristics. This second tube is modulated on odd fields by one piece of chrominance information and on even fields by the other piece of chrominance information. This alternate feeding of chrominance information results in a loss of vertical chrominance detail.

Still another system suggested amounts to a film recording of the electrical signal made visible on the cathode-ray tube. This system brings about substantially the same results as the video tape recording using a magnetic tape for the recording of the electrical television signals.

The system in accordance with the present invention differs entirely from the known systems. At first it uses for the luminance signal preferably, but not necessarily, a full 16 or 35 mm. picture frame, assuring, therefore, no loss in definition and/or detail. Grain size problems will be appreciably reduced. Second, no particular focusing problem will be created in the present system, because the resolution of the optical system will be much better than the electronic definition. No noise disturbance can occur because a direct transmission is made from the film to the television pick-up tubes, and also no additional switching of the tubes is required. No additional flicker will be introduced because all three images are taken and reproduced simultaneously. Since a larger luminance image is provided, a better definition is obtained. The light loss in the optical system is of no importance, because the projector light source can be as large as required. The operational problems of the system are not affected by the shrinkage and/or registration because of the fact that the luminance information is of high definition, while the chrominance information is of lower definition.

The combination of a large picture image for the black-and-white image with two smaller images or frames for the color filtered frames is of great importance because of the known fact in the color printing art that a good color picture can be obtained from a highly defined black-and-white image combined with less defined or low resolution, red, green and blue images. The unexpected result is obtained by applying this known fact to the electrical system, which permits of production of the third color signal from the Y, R and B system by an adequate electronic matrix.

Referring now to Fig. 2 of the drawings, it will be found that a proper projector through which the previously recorded film is fed, brings the brightness TV pick-up and red and blue TV pick-ups, the former leading to a brightness adder, while the latter lead to a matrix, which will be described below, and from there to said brightness adder. The signals are then fed in conventional manner to a color-subcarrier modulation system and to a mixer.

The final luminance and chrominance signals can be obtained from the black-and-white film produced in accordance with the present system.

The total luminance as photographed on the large image can be defined the sum of the luminosities of the picture tube and the voltages of the three color signals:

$$Y' = Y_G G + Y_R R + Y_B B$$

$Y_G$, $Y_R$, $Y_B$ being the luminosities of the picture tube,
$G$, $R$, $B$ being the voltages of the three color signals.

The total luminance $Y_T$ is the combined luminosity of the three colors.

The matrix used with the present system, applying the black-and-white signal directly and the red and blue signal, is made in accordance with standards of the NTSC system. The black-and-white signal must match the black-and-white signal that would be created in the conventional system. The red and blue signal must match the signal originating from the scene if taken from the red and blue signal of the TV camera. The gamma for the film must be about $\frac{1}{65}$ for a vidicon tube.

The color picture signal should satisfy the following conditions $$E_M = E'_Y + \{E'_{Q'} \sin (wt + 33°) + E_{I'} \cos (wt + 33°)\}$$
$$E_{Q'} = 0.41(E_{B'} - E_{Y'}) + 0.48(E_{R'} - E_{Y'})$$
$$E_{I'} = 0.27(E_{B'} - E_{Y'}) + 0.74(E_{B'} - E_{Y'})$$
$$E_{Y'} = 0.30(E_{R'}) + 0.59(E_{G'}) + 0.11(E_{B'})$$

$E_M$ being the total video voltage applied to the modulation.

$E_{Y'}$ is the gamma corrected voltage of the monochrome signal.

$E_{R'}$, $E_{G'}$, $E_{B'}$ are the gamma corrected voltages of the red, green and blue signals during scanning and are of the form:

$$E_{R'}=ER^{1/\gamma};\ E_{B'}=E_B^{1/\gamma};\ E_G^{1/\gamma};\ E_{G'}=E_G^{1/\gamma}$$

and $\gamma=2.2$

The equation for the green signal is as follows:

$$Eg'=1.69Ey'-0.51E_{R'}-0.18E_{B'}$$

The electronic matrix, a diagram of which is disclosed by example in Fig. 1, meets the above requirements. The green signal output is obtained by subtracting the red and blue signal from the monochrome signal in accordance with the above equation. The subtraction is performed in the first half of the 6BQ7A tube by feeding the monochrome or luminance signal into the grid while the red and blue signals are fed to the cathode through a resistor network. The output voltage of the first stage is given by the equation:

$$E_{O_1}=-1.01E_M+0.112E_B+0.512E_R$$

The second half of the 6BQ7A tube is adjusted to have a gain of 1.67. The output of the second stage is:

$$E_{O_2}=1.69E_M-0.52E_R-0.188E_B$$

The third stage, the 6CL6 tube is used as a cathode follower to match the cable carrying the green signal to the colorplexer. The fourth stage in the 6CL6 is inverted in order to create the necessary filters compensating for the time delays created in the matrixing stages.

The $E_M$ voltages are fed to the grid of the second 6CL6 tube and taken out from the plate of the tube.

Figure 13:
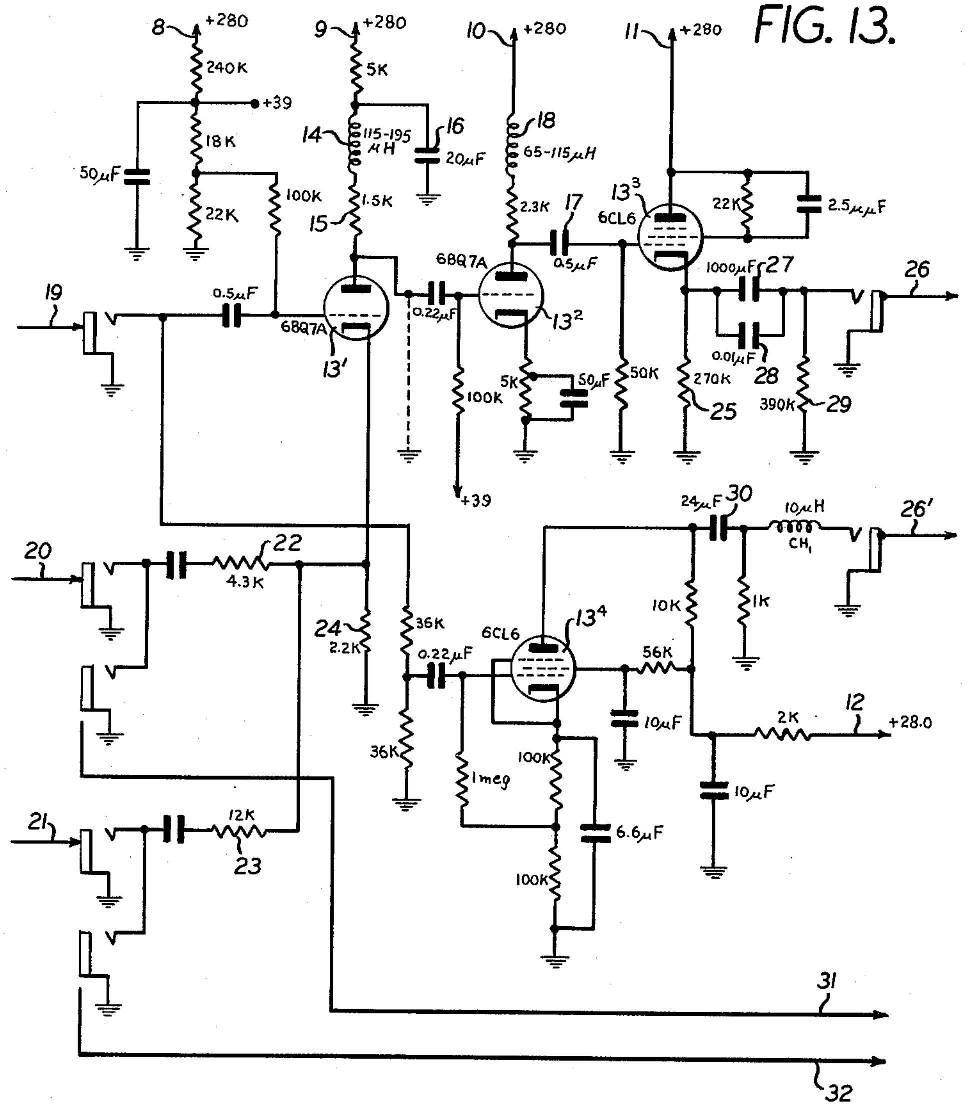
Fig. 13 is a circuit diagram of the electronic matrix particularly for the purpose of the present invention.

As clearly shown in Fig. 13 the circuit diagram has five inputs 8, 9, 10, 11 and 12 connected to the power supply. The fisrt power supply input 8 is used to obtain the necessary grid bias voltage of the first part 13' of the amplifier tube. The second input of said power supply 9 supplies the plate voltage to the first part 13' of the amplifier tube over two resistor 14 and 15 and one filter choke 16 is parallel. The third power supply input 10 is connected to the second part 13² of the amplifier tube through a choke 17 and a fixed resistor 18. The fourth power supply input 11 supplies the plate voltage to the output stage tube 13³. The fifth power supply input 12 supplies the plate and screen grid voltage to the second output tube 13⁴ through three resistors. The green signal output can be obtained by subtracting the red and blue signal from the black-and-white signal.

The electronic matrix circuit includes also three input coaxial terminations and four output coaxial terminations 26, 26', 31 and 32. The monochrome signal is fed into the incoming coaxial termination 19 and feeds into the control grid of the first part 13' of the amplifier tube. The red and blue signals are fed through the input coaxial terminations 20 and 21, respectively, through two resistor networks 22 and 23, respectively, to the cathode of the first part 13' of the amplifier tube. The cathode resistor 24 of the first part 13' of the amplifier tube provides the required bias voltage. The output voltage of the first part 13' of the amplifier tube is fed into the grid of the second part 13² of the amplifier tube. The voltage of the second part 13² is adjusted to have a gain of 1.67. The output voltage of the second part 13² of the amplifier tube is fed into the grid of the output stage 13³ of the amplifier tube which is used as a cathode follower in order to match the cable carrying the green signal to the colorplexer. The output voltage of the third stage 13³ of the amplifier tube is obtained on the cathode resistor 25 in this stage. The green signal voltage obtained in this resistor 25 is fed to the output coaxial termination 26 through a filter network consisting of the condensers 27 and 28 and the resistor 29. The monochrome signal which is required in the colorplexer is being fed from the incoming coaxial termination 19 to the control grid of the second part 13² of the amplifier tube, the output voltage of said tube being fed through the capacitor 30 to the output coaxial termination 26' of the monochrome signal for the colorplexer. The red signal and the blue signal of the incoming coaxial terminations 20 and 21 are connected directly to the outgoing coaxial terminations 31 and 32, respectively, of the red and blue signals feeding the colorplexer.

Referring now to Figs. 3 to 6, a mounting plate 33 is provided which carries a plurality of prisms 34, 35, 36 and 37. In order to mount the prisms 34, 35, 36 and 37 the following arrangement is made. The mounting plate 33 has screwed thereon the brackets 38 and 39 spaced apart from each other, while therebetween a double bracket 40 is designed to carry the prisms 35 and 37. In addition three adjustable lenses 41, 42, 43 are likewise mounted on the plate 33 by means of any suitable brackets 44, 45, and 46, respectively. The prism 34 is coordinated to the lens 43, the prism 35 to the lens 42 and the prism 36 to the lens 41.

The three light beams passing the prisms 34, 35 and 37 and the space therebetween are reflected in the following manner. The beam passing prism 35 is reflected to prism 34 and from this prism to lens 43 which projects a sharp image onto one vidicon tube. The light beam hitting prism 37 is reflected to prism 36. From this prism the light beam is sent to lens 41 which is projecting a sharp image onto another or a second vidicon tube. The third light beam passes the open space between the prisms 35 and 37 without hitting any prism directed to the lens 42 in order to project a sharp image on the third vidicon tube.

The system designed in accordance with the present invention permits the recording of color television images, which show on three cathode-ray tubes as black-and-white images. These images occurring on the cathode-ray tubes are recorded in such manner that one is a black-and-white field of high accuracy information and the other two fields are of lower accuracy information, which constitute the recording of blue and red information. This film is then used to project images into the above described television system, thereby creating again a color picture on a color monitor.

While I have disclosed several embodiments of the present invention, it is to be understood that these embodiments are given by example only and not in a limiting sense, the scope of the present invention being determined by the objects and the claims.

I claim:

1. In a color image signal translating system employing signals representative of the brightness of an image and representative of at least two colors of said image, means for obtaining the color information directly from said color image, means for obtaining the Y-information pertaining to the color information directly from said color image, a recording medium, means for recording said Y-information as one area on said recording medium, and means for recording said color information as a smaller area on said medium.

2. In a color image signal translating system employing signals representative of the brightness of an image and representative of blue and red colors of said image, means for obtaining red and blue color informations directly from said color image, means for obtaining the Y-information pertaining to the color information directly from said color image, a recording medium, means for recording said Y-information on said vehicle as one area, and means for recording said blue and red color informations as a smaller area on said recording medium.

3. The color image signal translating system, as set forth in claim 1, which includes means for reproducing said two color informations and said Y-information, means for combining said two color informations with said Y-information to produce a third color information.

4. In a color image signal translating system employing signals representative of the brightness of an image and representative of two colors of said image, means for obtaining the color information directly from said color image, means for obtaining the Y-information pertaining to the color information directly from said color image, a light-sensitive film, means for recording said Y-information as one area on said film, and means for recording said color information as a smaller area on said film.

5. The system, as set forth in claim 4, wherein said light-sensitive film has a plurality of adjacent frames, and said Y-information is disposed on one of said frames and two of said color informations are disposed on a frame adjacent said frame containing said Y-information.

6. The system, as set forth in claim 4, wherein said light-sensitive film has a plurality of frames disposed adjacent each other, and each of said frames has a larger portion for said Y-information and two smaller portions for said color information, said Y-information jointly with said two color informations being disposed on each of said frames.

7. In a color image signal translating system employing signals representative of the brightness of an image and representative of at least two colors of said image, means for obtaining the color information directly from said image, means for obtaining the Y-information pertaining to the color information directly from said color image, a recording medium, means for recording said Y-information as one area on said recording medium, and means for recording said color information separately for each of said colors as smaller areas on said recording medium.

References Cited in the file of this patent

UNITED STATES PATENTS

| | | |
|---|---|---|
| 2,217,907 | Kampfer et al. | Oct. 5, 1940 |
| 2,315,783 | Gilmore | Apr. 6, 1943 |
| 2,594,715 | Angel | Apr. 29, 1952 |
| 2,728,813 | Loughlin | Dec. 27, 1955 |
| 2,823,254 | Heuer et al. | Feb. 11, 1958 |
| 2,830,112 | Pritchard | Apr. 8, 1958 |
| 2,880,267 | Goldmark | Mar. 31, 1959 |

OTHER REFERENCES

Journal of the SMPTE, July 1956, vol. 65, pages 359–364.